United States Patent Office 3,226,333
Patented Dec. 28, 1965

3,226,333
TITANIUM AND TIN ACTIVATED MAGNESIUM BORATE LUMINESCENT MATERIAL
Peter Whitten Ranby and David Richard Palowkar, London, England, assignors to Thorn Electrical Industries Limited, London, England, a British company
No Drawing. Filed June 14, 1962, Ser. No. 202,368
Claims priority, application Great Britain, June 16, 1961, 21,910/61
3 Claims. (Cl. 252—301.4)

The present invention relates to luminescent materials for use in fluorescent discharge lamps, and on cathode ray tube screens and X-ray screens, and is a modification of the invention which is the subject of British Patent No. 737,474.

British Patent No. 737,474 describes and claims an artificial luminescent material comprising a magnesium borate activated with titanium, wherein the proportions of the elements magnesium, titanium and boron present in the material, expressed as the oxides of the elements magnesium, titanium and boron and by weight of the luminescent material, are from 50 to 85 percent of magnesium oxide, from 5 to 40 percent of titanium dioxide, and from 2 to 27 percent of boric oxide. The said patent further describes and claims a method of preparing an artificial luminescent material as claimed in any one of claims 1 to 3, and comprising a magnesium borate activated with titanium, the method including the steps of preparing an initial mixture in which the relative proportions by weight of the elements magnesium, titanium and boron present, expressed as the oxides of the elements magnesium, titanium and boron are from 50 to 85 percent of magnesium oxide, from 5 to 40 percent of titanium dioxide, and from 2 to 27 percent of boric oxide, and thereafter heating the initial mixture at a temperature of 1075° C. or higher to produce the luminescent material.

It has now been found that valuable luminescent materials are produced when tin in the form of a tin compound is added to the initial mixture in an amount expressed as stannic oxide not exceeding the total weight of the other constituents of the mixture (exclusive of the tin compound) expressed as oxides.

Accordingly, the present invention provides a luminescent material comprising a magnesium borate containing titanium and tin, wherein the amounts of magnesium, boron and titanium present expressed as their oxides, are from 50 to 85 parts by weight of magnesium oxide, from 5 to 40 parts by weight of titanium dioxide, and from 2 to 27 parts by weight of boric oxide, to a total of 100 parts by weight, and the amount of tin present expressed as stannic oxide is not more than 100 parts by weight. The invention also provides a method of preparing such a luminescent material which comprises preparing an initial mixture containing magnesium boron and titanium in amounts expressed as their oxides of from 50 to 85 parts by weight of magnesium oxide, from 5 to 40 parts by weight of titanium dioxide and from 2 to 27 parts by weight of boric oxide to a total of 100 parts by weight, the mixture further including tin in the form of a tin compound in an amount expressed as stannic oxide of not more than 100 parts by weight, and heating the initial mixture at a temperature of 1075° C. or higher to produce the luminescent material.

In the preferred material the amounts of magnesium, titanium and boron expressed as their oxides are from 50 to 70 parts by weight of magnesium oxide, from 8 to 30 parts by weight of titanium dioxide and from 10 to 27 parts of boric oxide. The material according to the invention may be modified by including within the said 100 parts from 0.2 to 10 parts of one or more of magnesium chloride, barium chloride, barium sulphate and sodium sulphate. The method according to the invention may be correspondingly modified for the preparation of these materials.

Two preparative procedures embodying the invention will be described by way of example.

*Example 1*

750 g. $MgSO_4 \cdot 7H_2O$ are dissolved in 2 litres of distilled water and 70 g. stannic oxide and 10 g. titanium dioxide are stirred in. To this is added a solution containing 500 g. ammonium carbonate in 2 litres of distilled water and the solutions are stirred together until the precipitate has coagulated. The precipitate is filtered off, rinsed with cold water, dried and ground to a fine powder.

100 g. of the precipitate so prepared and 15 g. boric acid are ground together and then heated in air to 1150–1200° C. for 1 hour. When cool, the product is ground and then reheated as before for 16 hours. When cool, the final product is ground to a fine powder, and this fluoresces a bright blue when excited by short wavelength ultra-violet radiation (e.g. of 2537 A.).

*Example 2*

| | G. |
|---|---|
| Magnesium oxide | 40 |
| Stannic oxide | 44 |
| Titanium dioxide | 15 |
| and | |
| Boric acid | 20 | were intimately ground together and then heated for 2 hours in air at 1220° C. When cool, the product is ground and reheated as before. The final product fluoresces bright blue when excited by short wavelength ultra-violet.

We claim:
1. A luminescent material consisting essentially of a magnesium borate containing titanium and containing significant quantities of tin and sufficient to produce enhanced blue, red and green emission when compared to a magnesium borate matrix activated by titanium alone, wherein the amounts of magnesium, titanium and boron present expressed as their oxides, are from 50 to 85 parts by weight of magnesium oxide, from 5 to 40 parts by weight of titanium dioxide, and from 2 to 27 parts by weight of boric oxide, to a total of 100 parts by weight, and the amount of tin present expressed as stannic oxide is not more than 100 parts by weight.

2. A luminescent material according to claim 1 wherein the amounts of magnesium, titanium and boron expressed as their oxides are from 50 to 70 parts by weight of magnesium oxide, from 8 to 30 parts by weight of titanium dioxide and from 10 to 27 parts of boric oxide.

3. A luminescent material according to claim 2 wherein the said 100 parts by weight includes from 0.2 to 10 parts of at least one member of the group consisting of magnesium chloride, barium chloride, barium sulphate and sodium sulphate.

References Cited by the Examiner
UNITED STATES PATENTS
2,758,094  8/1956  Ranby _____ 252—301

OTHER REFERENCES
Huniger et al., Canadian Patent No. 408,801, Canadian Patent Office Record vol. 70, 1942, page 3161.
Kroger, "Some Aspects of the Luminescence of Solids," Elsevier Pub. Co., New York, 1948, page 279.

TOBIAS E. LEVOW, *Primary Examiner.*
MAURICE A. BRINDISI, *Examiner.*